(No Model.) 2 Sheets—Sheet 1.
L. THANNER.
VELOCIPEDE SLED.
No. 497,290. Patented May 9, 1893.
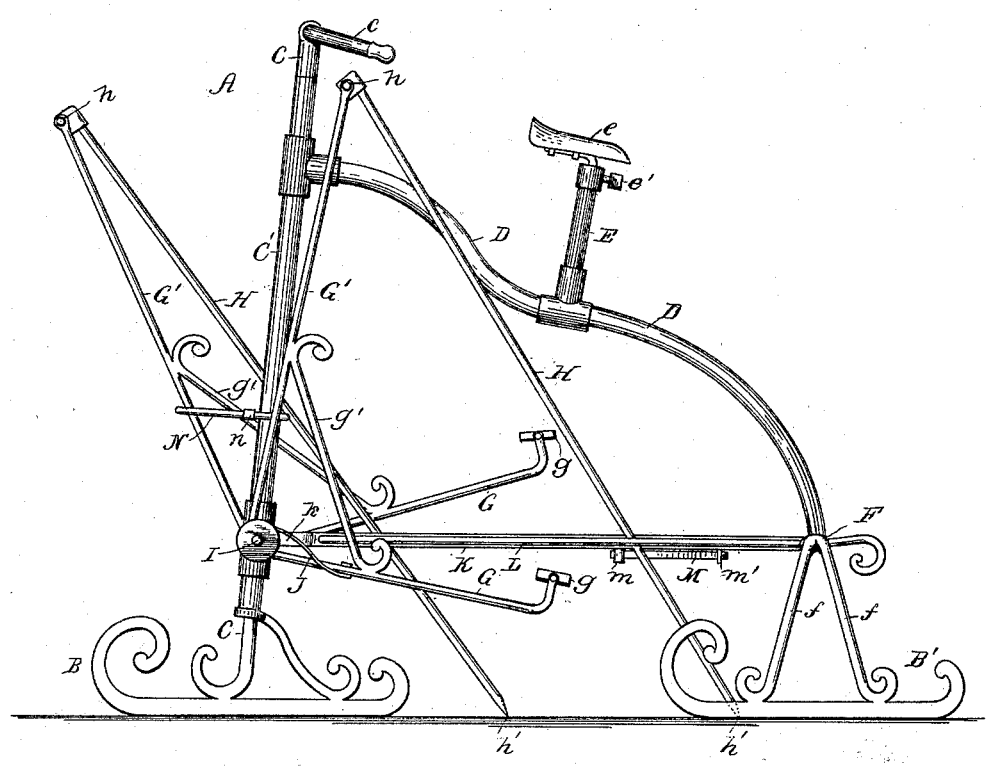
Fig. I.
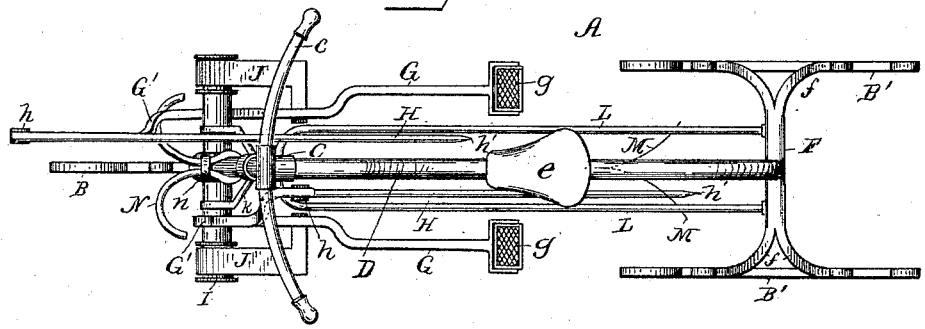
Fig. II.
Witnesses
E. P. Todd.
Pearl Young
Inventor.
Leonhard Thanner
By Lathy & Balderson,
His Attorneys.

(No Model.) 2 Sheets—Sheet 2.
L. THANNER.
VELOCIPEDE SLED.
No. 497,290. Patented May 9, 1893.
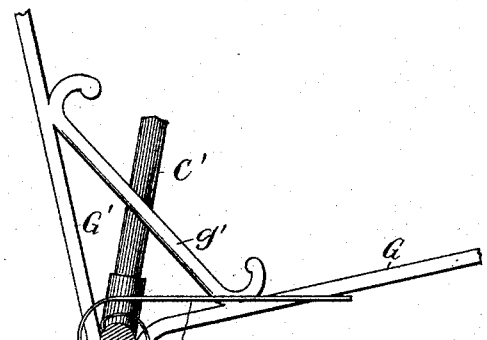
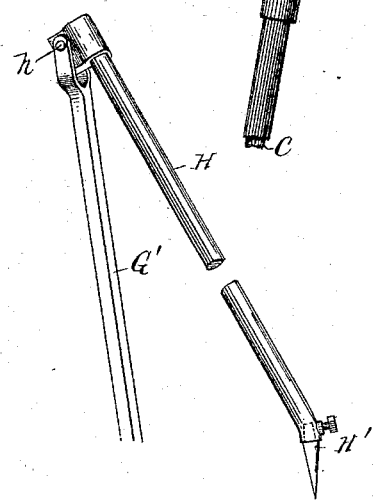
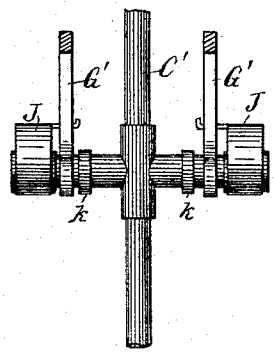
Witnesses:
E. O. Todd.
Pearl Young
Inventor:
Leonhard Thanner
By Lathy & Balderson,
his Attorneys.

UNITED STATES PATENT OFFICE.

LEONHARD THANNER, OF BOERWANG, GERMANY, ASSIGNOR OF TWO-FIFTHS TO EMIL CHRISTIANSEN, OF LEAVENWORTH, KANSAS.

VELOCIPEDE-SLED.

SPECIFICATION forming part of Letters Patent No. 497,290, dated May 9, 1893.

Application filed April 4, 1892. Renewed April 4, 1893. Serial No. 469,059. (No model.) Patented in Germany May 4, 1890, No. 54,872.

*To all whom it may concern:*

Be it known that I, LEONHARD THANNER, a subject of the Emperor of Germany, residing at Boerwang, in the Kingdom of Bavaria, German Empire, have invented certain new and useful Improvements in a Velocipede-Sled, (patented to myself by the Government of Germany by Letters Patent, dated May 4, 1890, No. 54,872,) of which the following is a full, clear, and exact description, reference being had to the accompanying drawings, forming a part hereof.

My invention relates to improvements in a self-propelling sled, and my object is, to construct a sled with a frame such as is used with a certain class of bicycles and velocipedes, and to provide same with a saddle and with pedals, the latter being secured on suitable levers, to which are hinged two push poles, so that by operating the levers with the feet, as when riding a bicycle or velocipede, said push poles will come in contact with the ice alternately and with a step like motion and propel the sled forward.

With this object in view my invention consists in the novel construction and arrangement set forth in the accompanying drawings, in which—

Figure I. is a side view of the sled, showing it complete. Fig. II. is a top plan view of same. Fig. III. is a detail view showing the manner in which the crank levers are secured to the bearings in frame. Fig. IV. is a detail view in perspective of one of the push-poles, showing the manner in which it is secured to the shank of crank lever, and Fig. V. is a detail front view of the stem of the velocipede frame, showing the crank levers, springs, &c., secured on the bearing.

Referring to the drawings by letter, A, represents my invention, consisting of a frame as shown, having a saddle secured thereon, two pedals, secured on crank levers, two push poles secured to the shanks of said levers, all mounted on runners: one guide runner B, and two rear runners B', or two guide runners B, and one rear runner B', or one guide runner and one rear runner, or two guide runners and two rear runners.

C represents a guide bar, connected to guide runner B, having a handle c for operating it; said guide bar being incased in a tube C', which forms a part of the frame.

D, represents the spine of the frame, on which is secured a vertical support E, to which a saddle e, is secured. Said support and saddle being so arranged that by means of the set screws e', the saddle may be adjusted to any desired height.

F, represents a cross frame which supports the spine rod D, and this cross frame is provided with standards f, f, to which are rigidly secured the rear runners B'.

G, represents the lever to which the pedals g, are secured and G', is the shank of this lever: the two extensions being strengthened by braces g' g'. Secured to the upper end of the levers G' are the push poles H, which are provided with points h' as seen in Fig. I, or as shown by H', as seen in Fig. IV. These push poles are hinged to levers G', by bolts or rivets h, as seen in Figs. I, II, and IV.

I, represents a bearing or axle, around which the crank levers G, G' are suitably secured. On the outer sides of crank levers G, and secured to axle I, are spiral springs J, which have an extension which rests under the levers G, and when said levers are forced down by the feet of the rider, said springs return them to their normal position as soon as they are released. Any sort of spring or device may be used to return said levers.

K, represents a bar which connects the bearing I with the cross frame F, to give the requisite degree of strength to the frame work. Said bar K, is secured to the axle I, by means of braces k. (See Fig. II.)

L, are parallel brace rods having their front ends secured to bar K, and their rear ends firmly secured to cross bar F, for purposes of strength.

M, are metallic stop springs, secured in a lug m, on the under side of bar K, their ends resting against lugs m' and their function is to prevent the push poles H from running back too far.

N, is a supporting frame or stop, to prevent the levers G' being thrown too far forward by springs J. (See Figs. I and II.)

Promotion of the sled is made by means of two push poles H, which push alternately and step like against the ice track, which time and again are set in the ice, and cause a continual movement of the runners.

The common pivot of the two levers G, constitutes the bolt or axle I, passing through the sled frame.

It is obvious that this sled is designed to be propelled by the rider himself, which is brought about by operating the pedals, which in turn operate the push poles, as heretofore described.

Having thus fully described my invention, what I claim, and desire to secure by Letters Patent, is—

1. A velocipede sled, consisting of a guide bar C, working in a tube C'; spine rod D, having its front end secured to the upper end of said tube and its rear end to a cross frame F; cross frame F, provided with runners B'; guide runner B, secured to the guide bar C; bearing I, secured to the tube C'; levers G, provided with pedals $g$, and shanks G', pivoted to the bearing I; push poles H, hinged to the extreme ends of said shanks; spiral springs J, having one end secured to the bearing I, and the other working under the levers G, the whole being provided with proper strengthening rods and braces, substantially as shown and described and for the purposes set forth.

2. A velocipede sled, consisting of a guide bar C, working in a tube C'; spine rod D, having its front end secured to the upper end of said tube and its rear end to a cross frame F; cross frame F, provided with runners B'; guide runner B, secured to the guide bar C; bearing I secured to the tube C'; levers G, provided with pedals $g$, and shanks G', pivoted to the bearing I; push poles H, hinged to the extreme ends of said shanks; spiral springs J, having one end secured to the bearing I, and the other working under the levers G; bar K, connecting with the bearing I, and cross frame F; stop springs M, their front ends secured in a lug $m$, on the under side of bar K, their rear ends resting against lugs $m'$, and stop N, secured to the sleeve C', the whole being provided with proper strengthening rods and braces, substantially as shown and described and for the purposes set forth.

In testimony whereof I affix my signature in presence of two witnesses.

LEONHARD THANNER.

Witnesses:
EUGEN RUGEL,
ALOIS EGLINGER.